United States Patent
Balema et al.

(10) Patent No.: US 11,764,416 B2
(45) Date of Patent: Sep. 19, 2023

(54) CHEMICAL DISMANTLING OF PERMANENT MAGNET MATERIAL AND BATTERY MATERIAL

(71) Applicant: Iowa State University Research Foundation, Inc., Ames, IA (US)

(72) Inventors: Viktor Balema, Ames, IA (US); Ihor Hlova, Ames, IA (US); Oleksandr Dolotko, Ames, IA (US); Vitalij K. Pecharsky, Ames, IA (US)

(73) Assignee: Iowa State Univerity Research Foundation, Inc., Ames, IA (US)

( * ) Notice: Subject to any disclaimer, the term of this patent is extended or adjusted under 35 U.S.C. 154(b) by 340 days.

(21) Appl. No.: 16/873,846

(22) Filed: Jul. 23, 2020

(65) Prior Publication Data

US 2021/0036387 A1    Feb. 4, 2021

Related U.S. Application Data

(60) Provisional application No. 62/922,315, filed on Aug. 2, 2019.

(51) Int. Cl.
| | |
|---|---|
| *H01M 10/54* | (2006.01) |
| *C22B 3/00* | (2006.01) |
| *C22B 1/00* | (2006.01) |
| *C22B 3/14* | (2006.01) |
| *C22B 23/00* | (2006.01) |
| *C22B 59/00* | (2006.01) |
| *C22B 3/44* | (2006.01) |

(52) U.S. Cl.
CPC ............. *H01M 10/54* (2013.01); *C22B 1/005* (2013.01); *C22B 3/14* (2013.01); *C22B 23/00* (2013.01); *C22B 23/0446* (2013.01); *C22B 59/00* (2013.01); *C22B 3/44* (2013.01)

(58) Field of Classification Search
CPC .......... H01M 10/54; C22B 1/005; C22B 3/14; C22B 23/00; C22B 23/0446; C22B 59/00; C22B 3/44
See application file for complete search history.

(56) References Cited

U.S. PATENT DOCUMENTS

| | | | |
|---|---|---|---|
| 3,912,554 A | 10/1975 | Arendt et al. | 148/105 |
| 2017/0275732 A1* | 9/2017 | Brewer | C25C 7/00 |
| 2018/0312941 A1 | 11/2018 | Mudring et al. | |

FOREIGN PATENT DOCUMENTS

| | | |
|---|---|---|
| CN | 104294032 A | 1/2015 |
| CN | 106498190 A | 3/2017 |

(Continued)

OTHER PUBLICATIONS

Machine Language English translation of WO-03078671-A1, Sep. 25, 2003 (Year: 2003).*

(Continued)

*Primary Examiner* — Scott R Kastler (57) ABSTRACT

Certain method embodiments are described and useful for recycling permanent magnet materials (e.g. permanent magnet alloys) and battery materials (e.g. battery electrode materials) to extract critical and/or valuable elements including REEs, Co and Ni. Method embodiments involve reacting such material with at least one of an ammonium salt and an iron (III) salt to achieve at least one of a liquid phase chemical reaction and a mechanochemical reaction.

32 Claims, 6 Drawing Sheets

(56) References Cited

FOREIGN PATENT DOCUMENTS

| DE | 102014206223 A1 | 4/2014 |
|---|---|---|
| JP | 2014-51718 | 3/2014 |
| WO | 03/078671 A1 | 9/2003 |
| WO | 2014/057911 A1 | 4/2014 |

OTHER PUBLICATIONS

Masahiro Itoh et al, Novel rare earth recovery process on Nd—Fe—B magnet scrap by selective chlorination using NH4Cl, Journal of Alloys and Compounds, 477, p. 484-487, 2009.

Meng-Meng Wang et, An environmental benign process for cobalt and lithium recovery from spent lithium-ion batteries by mechanochemical approach, Waste Management, 51, 239, 2016.

Li Li et al, Environmentally friendly leaching reagent for cobalt and lithium recovery from spent lithium-ion batteries, Waste Management, 30, p. 2615-2621, 2010.

E.G. Polyakov et al, Recycling Rare-Earth-Metal Wastes by Pyrometallurgical Methods, Metallurgist, 59, Nos. 5-6, 2015.

Yu-Yang Bian et al, Recovery of rare earth elements from permanent magnet scraps by pyrometallurgical process, Rare Metals, DOI 10.1007/s12598-013, 2013.

Guo-xing Ren et al, Recovery of valuable metals from spent lithium ion batteries by smelting reduction process based on FeO—SiO2—Al2O3 slag system, Trans. Nonferrous Met. Soc. China, 27, p. 450-456, 2017.

Tom Lorenz et al, Recycling of Rare Earths from FeNdB-Magnets by Solid State Clorination, Chem. Ing. Tech., 89, No. 9, p. 1210-1219, 2017.

Jimin Lee et al, Near Theoretical ultra-high magnetic performance of rare-earth nanomagnets via ithe synthesis combination of calcium-ireduction and chemoselective dissolution, Scientific Reports, 8, 15656, 2018.

Mikiya Tanaka et al, Recycling of Rare Earths from Scrap, Handbook on the Physics and Chemistry of Rare Earths, vol. 43, 2013.

Hong Hocheng et al, Biohydrometallurgical Recycling of Metals from Industrial Wastes, CRC Press, 63-91, 2018.

D. Larcher et al, Towards greener and more sustainable batteries for electrical energy storage, Nature Chemistry, vol. 7, p. 19-27, 2014.

Kanggen Zhou et al, Sulfuric Acid Leachingof Sm—Co Alloy Waste and Separation of Samarium from Cobalt, Hydometallurgy, 2017.

P. N. Iyer et al, Double Sulfates of Plutonium(III) and Lantanides With Sodium, Journal of the Less-Common Metals, 146, p. 161-166, 1989.

T. Aitasalo et al, Structural, magnetic and spectroscopic investigations of europium oxychloride, EuOCl, Journal of Alloys and Compouunds, 380, p. 296-302, 2004.

Changbeen Song, Production of Sm2Co17 Type Permanent Magnets Materials by th Reduciton-Diffusion Process, Shigen-to-Sozi, vol. 110, p. 1145-1150, 1994.

Tetsuya Uda, Recovery of Rare Earths from Magnet Sludge by Fe2Cl, Materials Transactions, vol. 43, No. 1, p. 55-62, 2002.

Masahiro Itoh et al, Extraction of Rare Elements from Nd—Fe—B Magnet Scraps by NH4Cl, Chemistry Letters, vol. 37, No. 3, 2008.

Xiang Chen et al, Hydrometallurgical recovery of metal values from sulfuric acid leaching liquor of spent lithium-ion batteries, Waste Management, 38, p. 349-356, 2015.

J.W. Lyman et al, Recycling of Rare Earths and Iron from NdFeB magnet scrap, High Temperature Materials and Processes, vol. 11, Nos. 1-4, 1993.

Sarah M. . Hayes et al, Critical Minerals: A review of elemental trends in comprehesive criticality, Resources Policy, 59, p. 192-199, 2018.

\* cited by examiner

CHEMICAL DISMANTLING OF PERMANENT MAGNET MATERIAL AND BATTERY MATERIAL

RELATED PATENT APPLICATION

This application claims benefit and priority of U.S. provisional application Ser. No. 62/922,315 filed Aug. 2, 2019, the entire disclosure of which is incorporated herein by reference.

CONTRACTUAL ORIGIN OF THE INVENTION

This invention was made with government support under Contract No. DE-AC02-07CH11358 awarded by the U.S. Department of Energy. The government has certain rights in the invention.

FIELD OF THE INVENTION

The present invention relates to the recycling of permanent magnet materials and battery materials to recover critical and/or valuable constituent elements thereof.

BACKGROUND OF THE INVENTION

Rare earth metals, including lanthanum (La), gadolinium (Gd), neodymium (Nd), dysprosium (Dy), praseodymium (Pr), terbium (Tb), samarium (Sm), and other, are among critical elements, demand for which has increased and continues to grow in parallel with the expansion of high technology areas, such as clean energy, transportation, and portable electronics. Together with other critical elements, such as cobalt (Co) and nickel (Ni), rare earths are essential for manufacturing of high performance magnets and batteries used in a number of applications, including power generators, electric motors, magnetic refrigerators and heat pumps, mobile phones, computers, and other electronic devices. Currently, rare earth metals and Co are at risk of supply disruptions. Recovering these elements from waste is a viable way of addressing supply risks and challenges.

Chemical dismantling and dissolution of spent magnet and battery materials during their recycling often requires strong acids and generates toxic liquid wastes or fumes. The latter must be converted into environmentally benign products, making the dissolution step a main impediment to the economics of recycling processes. As a result, spent materials and devices that contain many of the critical elements end up in landfills.

Recycling of electronic wastes and batteries is commonly performed according to hydrometallurgical, biohydrometallurgical, or pyrometallurgical protocols. Common steps for the majority of the recycling processes comprise of:

1—Physical processing, which involves demagnetization or discharge, disassembly, and separation of parts;

2—Mechanical processing by shredding, crushing, grinding and sieving;

3—Chemical conversion by smelting, leaching or dissolution;

4—Separation of desired chemical elements and purification of end-products by precipitation, recrystallization, electrolysis and other appropriate techniques.

In some cases, pyrometallurgical methods may bypass the mechanical processing step (i.e., step 2 above) and use high-temperature smelting to produce slags comprising critical elements, which can be reacted with strong acids to form water-soluble products suitable for the separation and purification step (#4 above).

While less hazardous than pyro- and hydrometallurgy, biohydrometallurgical approaches suffer from long processing times, often extending over more than 5-10 days for a single batch, and also presents challenges associated with bacterial incubation (acidity and temperature control required).

Hydrometallurgical processes involve chemical dissolution of spent materials in strong acids. They are relatively energy efficient, but generate highly-acidic hazardous wastes, which require further treatment that drastically reduces overall economic benefits of the hydrometallurgical recycling.

There is therefore a strong demand for cost-effective and environmentally-benign approaches to recycling of spent rare earth metals- and Co-containing materials incorporated into permanent magnets, electronic and energy generation devices, and batteries.

Several approaches to non-acid dissolution of spent magnetic and battery materials have been considered.

$NH_4Cl$, has been used as chlorination agent in several high-temperature solid-state processes converting rare-earth element (REE) containing alloys into water soluble metal salts via calcination of solid materials with solid $NH_4Cl$ at temperatures exceeding 200° C. (references 11, 12, 13, 14, 15, 16, 17, 18, 19) It has been also reported that aqueous solutions of $NH_4Cl$ do not react with permanent magnets prepared from REEs and such elements as Co, Fe or Mn (references 20, 21, 22). However, oxidation of REE containing magnetscraps by oxygen or air in aqueous $NH_4Cl$ solutions speeds up their conversion into insoluble REE derivatives, which can be further dissolved in mineral acids and used to recover pure REEs (reference 23).

Iron (II) chloride, $FeCl_2$, has been proposed as a chlorination agent for dismantling spent magnetic materials in melt at high temperatures close to 730° C. (reference 24), but practical implementations of this high temperature method are not known.

Mudring et al. US 2018/0312941 A1 of common assignee describes applications of Cu(II) salts for the dissolution of permanent magnets and magnetic materials, whereby Cu(II) is converted into $Cu^0$ (metallic copper) and the elements forming the recycled materials are transformed into water soluble salts.

The present invention has as an object to provide an alternative method of recycling of permanent magnet materials and battery materials that involves using certain relatively inexpensive, environmentally benign chemical dismantling agents.

SUMMARY OF THE INVENTION

The present invention provides method embodiments useful for recycling permanent magnet materials (e.g. permanent magnet alloys) and battery materials (e.g. battery electrode materials) to extract critical and/or valuable elements including REEs, Co and Ni. Method embodiments involve reacting such material with at least one of an ammonium salt and an iron (III) salt to achieve at least one of a liquid phase chemical reaction or a mechanochemical reaction.

Illustrative method embodiments involve chemical and/or mechanochemical dismantling (recycling) such materials to recover products that can include, but are not limited to, metal salts, metal oxides, metal oxalates and/or other organometallic derivatives. The desired products can be separated from by-products and contaminants, and further used for manufacturing of new magnets, battery electrodes or in other applications.

A particular illustrative method embodiment involves chemical conversion of permanent magnet materials and battery electrode materials in aqueous solutions, or solutions containing water as one component, in the presence of one or more acid-free chemical agents such as ammonium salts, $(NH_4)_mX$, and/or Fe(III) salts, $Fe_nX_3$, where $X=Cl^-$, $Br^-$, $I^-$, $NO_3^-$, $HSO_4^-$, $SO_4^{2-}$, etc.; m=1 or 2 and n=1 or 2 without the need for addition of further oxidizing agents such as oxygen. Heating the reaction mixtures up to about 100° C. or cooling them down to 0° C. may be employed as to increase the reaction rates, or to improve the selectivity of chemical processes.

Another particular illustrative method embodiment involves solvent-free (e.g. in the absence of water or other liquid solvent) dismantling of permanent magnet materials or battery electrode materials by their mechanical processing in the presence of one or more chemical reagents such as ammonium salts, $(NH_4)_mX$, and/or Fe(III) salts, $Fe_nX_3$, where $X=Cl^-$, $Br^-$, $I^-$, $NO_3^-$, $HSO_4^-$, $SO_4^{2-}$, etc., m and n=1 or 2. Thus obtained powders can be further dispersed in water at temperatures between 0° C. and 100° C. to extract desired critical and/or valuable elements in the form of water soluble salts.

Finally, both ammonium salts and Fe-compounds remaining in solutions formed after dismantling permanent magnet materials and battery materials can be reclaimed using conventional chemical techniques such as sublimation of ammonium salts or oxidation of Fe(II) to Fe(III) compounds by appropriate oxidizing agents.

Practice of embodiments of the present invention provides advantages that include, but are not limited to:

1. Utilization of widely available inexpensive, environmentally benign chemical reagents such as ammonium chloride, iron(III) chloride or other common ammonium salts, $(NH_4)_mX$, or Fe(III) salts, $Fe_nX_3$, where $X=Cl^-$, $Br^-$, $I^-$, $NO_3^-$, $HSO_4^-$, $SO_4^{2-}$, etc. to effect chemical or mechanochemical reactions without the need for addition of further oxidizing agents.

2. Scalability of the chemical and mechanochemical reactions constituting the proposed recycling approach.

3. Cost efficiency and low environmental impact due to utilization of inexpensive and environmentally benign iron and ammonium salts.

4. Elimination or drastic reduction of hazardous waste streams to foster environmental sustainability.

5. Easy recovery and reuse of ammonium and Fe(III) salts.

These and other advantages of the present invention will become apparent from the following detailed description taken with following drawings.

DETAILED DESCRIPTION OF THE INVENTION

Certain embodiments of the present invention are useful for recycling spent REE-containing magnetic alloys or battery materials to extract critical and/or valuable elements including rare earths, Co or Ni. Illustrative embodiments of the present invention employ liquid phase chemical reactions and/or mechanochemical reactions, which can be performed in the temperature range between 0° C. and 100° C. The mechanochemical processing can include, but is not limited to, ball-milling, shredding, grinding, and/or extruding and combinations thereof. The mechanochemical processing is conducted in the presence of one or more chemical agents selected to convert the recycled material into water soluble intermediates. This processing may be carried out in the absence of, or optionally in the presence of minor amounts, e.g. less than 10 wt. %, of water, or other liquid solvent.

In some embodiments, the mechanochemical step, such as ball milling, is performed first followed by a liquid phase chemical processing step of the solid product obtained from the first step using appropriate liquid phase chemical reactions.

In one illustrative embodiment, iron (III) salt, containing anions such as $Cl^-$, $Br^-$, $I^-$, $NO_3^-$, $HSO_4^-$ or $SO_4^{2-}$ is employed as reagent dismantling REE-based alloy to form a mixture of water soluble metal salts, which can be treated with an appropriate reagent such as sodium sulfate or oxalic acid to precipitate sodium (Na)-REE sulfate or REE oxalate, suitable for further conversion into useful products using conventional protocols.[25] For example, Sm- or Nd-containing magnetic alloy is converted into water-soluble Sm or Nd salts that can be further transformed into insoluble NaREE $(SO_4)_2 \cdot H_2O$ compound by the reaction with $Na_2SO_4$ in aqueous solution, whereby all chemical reactions are carried out in an aqueous solution at the temperature below 100° C. with no addition of further oxidizers as illustrated below.

$$SmCo_5 + 13FeX_3 = SmX_3 + 5CoX_2 + 13FeX_2$$

$$SmX_3 + 2Na_2SO_4 + H_2O = NaSm(SO_4)_2 \cdot H_2O \downarrow + 3NaX$$

$$Nd_{15}Fe_{77}B_8 + 199FeX_3 = 15NdX_3 + 276FeX_2 + 8\{B\}$$

$$NdX_3 + 2Na_2SO_4 + H_2O = NaNd(SO_4)_2 \cdot H_2O \downarrow + 3NaX$$

$$Nd_{15}Fe_{77}B_8 + 45FeX_3 + \{\text{solid-state milling}\} = [NdX_3]_{15}[FeB_8][FeX_2]_{45}$$

$$[NdX_3]_{15}[Fe_{77}B_8][FeX_2]_{45} + xH_2O = 15NdX_3 + 45FeX_2 + \{Fe_{77}B_8(OH_2)_x\} \downarrow$$

$$NdX_3 + 2Na_2SO_4 + H_2O = NaNd(SO_4)_2 \cdot H_2O \downarrow + 3NaX$$

In another illustrative embodiment, ammonium salt containing such anions as $Cl^-$, $Br^-$, $I^-$, $NO_3^-$, $HSO_4^-$ or $SO_4^{2-}$ is employed as a reagent for dismantling of REE-containing alloy to form a reaction mixture containing a water soluble REE salt, which can be treated with an appropriate reagent, including sodium sulfate or oxalic acid, precipitating $NaREE(SO_4)_2 \cdot H_2O$ or REE oxalate, suitable for conversion into corresponding metal oxides using conventional protocols reference 27).

$$Nd_{15}Fe_{77}B_8 + 199NH_4X = 15NdX_3 + 77FeX_2 + 8\{B\} + 199NH_3 + 99.5H_2$$

$$NdX_3 + 2Na_2SO_4 + H_2O = NaNd(SO_4)_2 \cdot H_2O \downarrow + 3NaX$$

In another illustrative embodiment, an ammonium salt containing such anions as $Cl^-$, $Br^-$, $I^-$, $NO_3^-$, $HSO_4^-$ or $SO_4^{2-}$ is employed as reagent for dismantling of a solid Co-containing magnetic alloy to produce a reaction mixture containing water-soluble Co salt, which after filtration or centrifugation, is treated with an appropriate reagent, including oxalic acid to precipitate Co oxalate suitable for conversion into Co oxide or another valuable compound. Mechanochemical processing (ball-milling) of the Co-containing magnetic alloy-ammonium salt mixture, mentioned above, substantially increases the yield of the final product. The REE content of the starting magnetic material is recovered by treating the insoluble fraction of the reaction mixture with Fe (III) salt in aqueous solution.

$$3SmCo_5 + 30NH_4X + 30H_2O = 15\text{-}xCoX_2 + [Sm_3Co_xX_{2x}] \downarrow + 30NH_4OH + 15H_2$$

$$CoX_2 + HO(O)C\text{—}C(O)OH + 2NH_4OH = Co\{O(O)C\text{—}C(O)O\} \downarrow + 2NH_4X + 2H_2O$$

Subsequently, after the filtration or centrifugation, the solution formed is treated with an appropriate reagent such as $Na_2SO_4$ or oxalic acid.

$$[Sm_3Co_xCl_{2x}] + 9FeX_3 = 3SmX_3 + xCoCl_2 + 9FeX_2$$

$$SmX_3 + 2Na_2SO_4 + H_2O = NaSm(SO_4)_2 \cdot H_2O \downarrow + 3NaX$$

The precipitated $NaREE(SO_4)_2 \cdot H_2O$ or REE oxalate can be further converted into corresponding metal oxides using conventional chemical protocols (reference 27).

In another illustrative embodiment, ammonium salt containing such anions as $Cl^-$, $Br^-$, $I^-$, $NO_3^-$, $HSO_4^-$ or $SO_4^{2-}$ is employed as reagent for dismantling a solid REE-based battery material to form a reaction mixture containing a water soluble REE salt, which can be treated with an appropriate reagent, including $Na_2SO_4$ or oxalic acid, precipitating $NaREE(SO_4)_2 \cdot H_2O$ or REE oxalate, suitable for conversion into corresponding metal oxide using conventional protocols (reference 27). The transition metal component of the battery material remains undissolved and is isolated in the metallic form.

$$LaNi_5 + 3NH_4X + 3H_2O = LaX_3 + 5Ni \downarrow + 3NH_4OH + 1.5H_2$$

$$LaX_3 + 2Na_2SO_4 + H_2O = NaLa(SO_4)_2 \cdot H_2O \downarrow + 3NaX$$

In another illustrative embodiment, magnetic scrap material, which is obtained by mechanical crushing of used computer hard drives, has been treated with iron (III) salt, containing anions such as $Cl^-$, $Br^-$, $I^-$, $NO_3^-$, $HSO_4^-$ or $SO_4^{2-}$ to form a mixture of water soluble metal salts, which can be treated with an appropriate reagent such $Na_2SO_4$ or oxalic acid, precipitating $NaREE(SO_4)_2 \cdot H_2O$ or REE oxalate, suitable for further conversion into useful products using conventional protocols (reference 27).

The characterization of the reaction products by powder X-ray diffraction (XRD) analysis was carried at room temperature using a PANalytical powder diffractometer utilizing Cu-K$\alpha_1$ radiation with a 0.02° 2θ step in the range of Bragg angles 2θ from 10° to 80°. The X-ray fluorescence (XRF) analysis was carried out in a Brooker M4 Tornado spectrometer with 50 microA/200V X-ray beam and the spot size of 25 microns. XRF spectra evaluation performed using the Mineral Standard Database, incorporated into spectrometer software. The yields of products were calculated based on actual amounts of the isolated materials.

The ball milling of materials was performed in a SPEX 8000M shaker mill in air using 50 ml hardened-steel vial with 20 g (g=grams) of steel balls (two large balls weighing 8 g each and four small balls weighing 1 g each).

The practical applications of the invention was demonstrated using commercial materials: $Nd_{15}Fe_{77}B_8$ (lumps), $SmCO_5$ (powder) and $LaNi_5$ (powder), which were purchased from Alfa Aesar and used as received.

Figure 10:
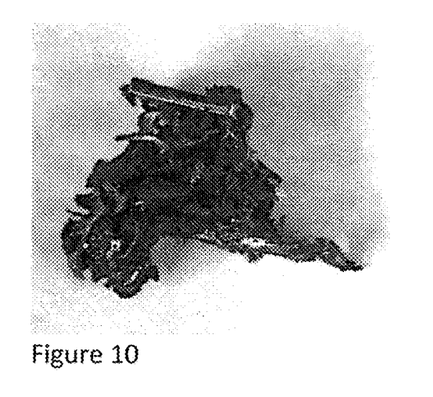
FIG. 10. The magnet scrap material (MSM) obtained by mechanical crushing of used computer hard drives and removing large structural fragments that do not include a magnet as component.

The magnet scrap material (MSM, FIG. 10), obtained by mechanical crashing of used computer hard drives and removing large structural fragments, which do not include magnets as component, has been utilized for testing the developed recycling protocols on a real-life object. The recoverable REE content in this MSM was determined by its complete dissolution in the concentrated hydrochloric acid and subsequent precipitation of $NaREE(SO_4)_2 \cdot H_2O$ from the solution formed using an excess of $Na_2SO_4$.

The following examples are offered to further illustrate the invention in more detail without limiting the scope of the invention.

Example 1

Figure 1:
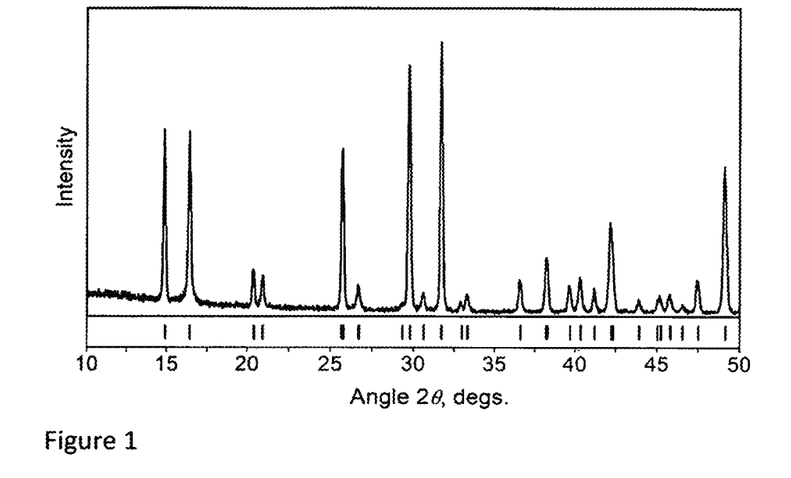
FIG. 1. Powder X-ray diffraction (XRD) pattern of NaNd $(SO_4)_2 \cdot H_2O$ obtained in Example 1. Vertical bars at the bottom of the plot correspond to calculated Bragg peak positions of NaNd$(SO_4)_2 \cdot H_2O$.

1.0 g of $Nd_{15}Fe_{77}B_8$ (0.15 mmol) permanent magnet alloy and 4.9 g (30.10 mmol) of anhydrous $FeCl_3$ were combined with 150 ml of water and the slurry formed was brought to a boil (about 100° C.) while stirred with a magnetic stirrer. The starting alloy dissolved within 60 min. The heating continued for additional 30 min. The solution was left stirring at room temperature overnight, then it was filtered through a glass-frit. Subsequently, water was partially evaporated to obtain 50 ml of the clear solution. 1.2 g of anhydrous $Na_2SO_4$ was added to the latter at 100° C. $Na_2SO_4$ quickly dissolved and an off-white precipitate started to form within a few minutes. 0.78 g of the water-insoluble product was filtered off and dried in air. The material was identified as $NaNd(SO_4)_2 \cdot H_2O$ using XRD (FIG. 1). The isolated yield of $NaNd(SO_4)_2 \cdot H_2O$ was 90% of the theoretically expected amount. Note: $Nd_{15}Fe_{77}B_8$ does not react with pure water even upon boiling.

Example 2

Figure 2:
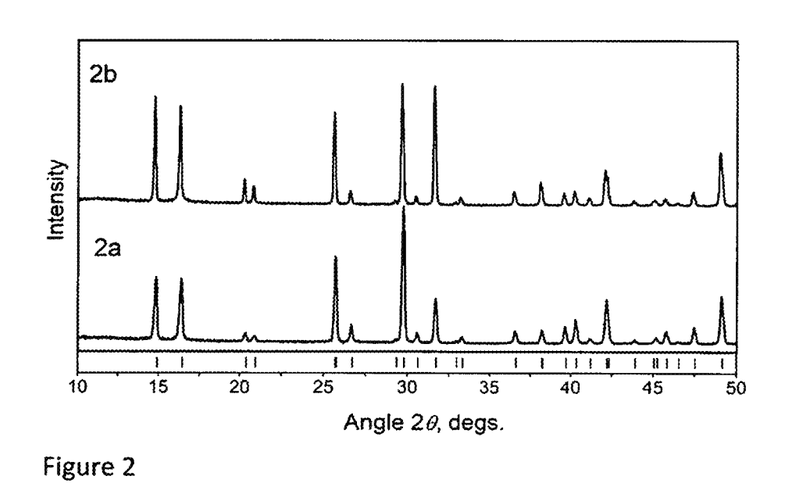
FIG. 2. Powder XRD patterns of NaNd$(SO_4)_2 \cdot H_2O$ obtained in Examples 2a and 2b. Vertical bars at the bottom of the plot correspond to calculated Bragg peak positions of NaNd$(SO_4)_2 \cdot H_2O$.

(a) 0.66 g of $Nd_{15}Fe_{77}B_8$ (0.10 mmol) and 0.74 g (6.8 mmol) of anhydrous $FeCl_3$ were ball-milled in a Spex 8000M shaker mill for 24 hours. Distinct formation of metallic iron has been observed in the milled sample using XRD. Subsequently, the obtained powder was combined with 100 ml of water and the slurry formed was brought to a boil (100° C.) and stirred at that temperature for one hour. The reaction mixture turned blue first, then it became light brown. Stirring continued at room temperature overnight, then the solution was filtered through a glass frit. The obtained liquid was heated up to 80° C. and combined with 1 g of anhydrous $Na_2SO_4$. $Na_2SO_4$ quickly dissolved and an off-white precipitate started to form within a few minutes. 0.5 g of the solid product was filtered off and dried in air. The material was identified as $NaNd(SO_4)_2 \cdot H_2O$ using XRD analysis (FIG. 2). The isolated yield of $NaNd(SO_4)_2 \cdot H_2O$ was 87% of the theoretically expected amount.

(b) A similar experiment was performed with 1.0 g of $Nd_{15}Fe_{77}B_8$ (0.15 mmol) and 1.1 g (6.8 mmol) of anhydrous $FeCl_3$ in aqueous solution without a preceding milling step. Also in this case, $NaNd(SO_4)_2 \cdot H_2O$ formed. However, its yield was only 0.43 g, i.e. 49% of the theoretically expected amount.

Example 3

Figure 3:
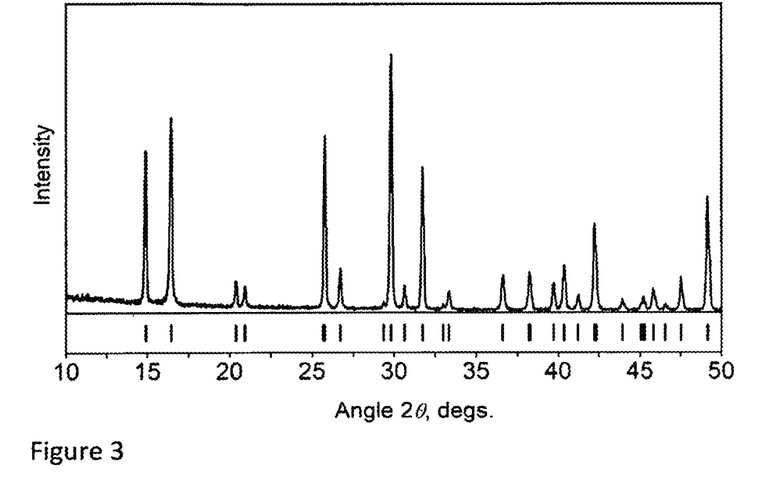
FIG. 3. Powder XRD pattern of NaNd$(SO_4)_2 \cdot H_2O$ obtained in Example 3. Vertical bars at the bottom of the plot correspond to calculated Bragg peak positions of NaNd$(SO_4)_2 \cdot H_2O$.

1.0 g of $Nd_{15}Fe_{77}B_8$ (0.15 mmol) and 1.6 g (30 mmol) of anhydrous $NH_4Cl$ were combined with 100 ml of water and the slurry formed was brought to a boil (about 100° C.) while stirred with a magnetic stirrer. The stirring at about 100° C. continued for 4 hours, then at room temperature overnight. After the filtration through a glass frit, water was partially evaporated to obtain 50 ml of a clear solution. 1.2 g of anhydrous $Na_2SO_4$ was added to the latter at about 100° C. The sulfate quickly dissolved and off-white precipitate started to form within a few minutes. The slurry formed was kept at about 80° C. for 1.5 hours. 0.70 g of a solid product was filtered off and dried in air. The product was identified as $NaNd(SO_4)_2 \cdot H_2O$ using XRD analysis (FIG. 3). The isolated yield of $NaNd(SO_4)_2 \cdot H_2O$ was 81% of the theoretically expected amount.

Example 4

1.0 g of $SmCo_5$ (2.20 mmol) and 4.9 g (29.0 mmol) of anhydrous $FeCl_3$ were combined with 100 ml of water and the slurry formed was stirred using a magnetic stirrer at room temperature for one hour. $SmCo_5$ dissolved within 60 min. Water was evaporated and 5.42 g of the remaining solid material was re-dissolved in hot water and filtered through a paper filter to obtain a clear pink solution. The residue on the filter was washed with 50 ml of water. Subsequently, the pink solution was heated up to 80° C. and 1.25 g of anhydrous $Na_2SO_4$ was added. The solution had been stirred at 80-100° C. until precipitation started.

Figure 4:
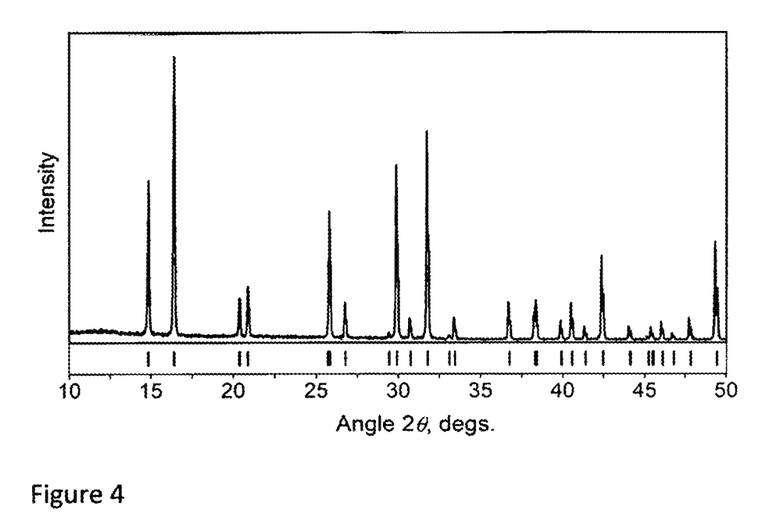
FIG. 4. Powder XRD pattern of NaSm$(SO_4)_2 \cdot H_2O$ obtained in Example 4. Vertical bars at the bottom of the plot correspond to calculated Bragg peak positions of the NaSm$(SO_4)_2 \cdot H_2O$.

The solid formed was filtered off using a glass frit. After drying in air it was identified as $NaSm(SO_4)_2 \cdot H_2O$ using XRD analysis (FIG. 4). The isolated yield of $NaSm(SO_4)_2 \cdot H_2O$ was 0.63 g, i.e. 80% of the theoretically expected amount.

Example 5

Figure 5:
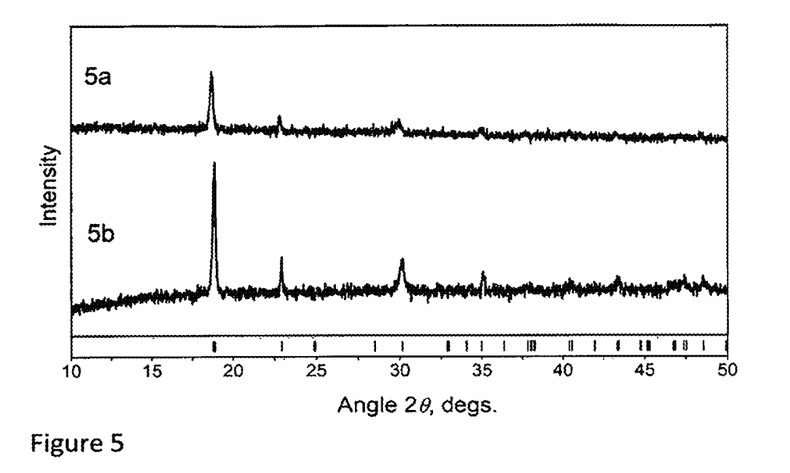
FIG. 5. Powder XRD patterns of Co oxalate obtained in Examples 5a and 5b. Vertical bars at the bottom of the plot correspond to calculated Bragg peak positions of $[C_2O_4]$Co·$2H_2O$.
Figure 6:
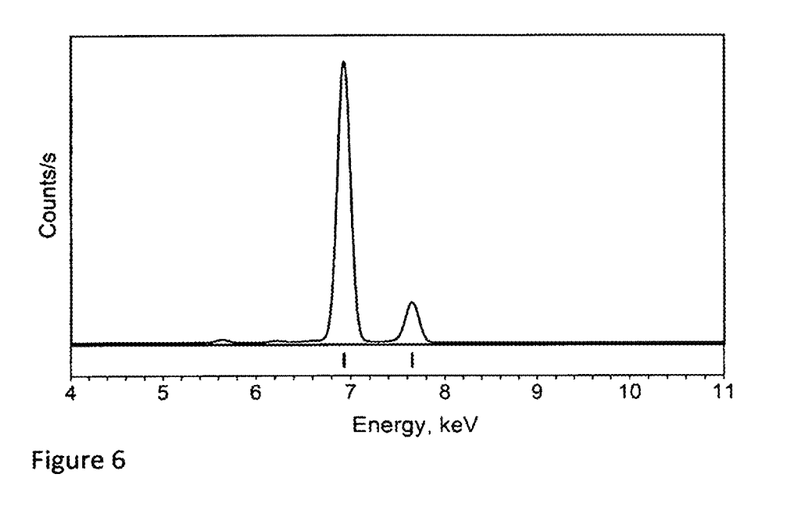
FIG. 6. X-ray fluorescence (XRF) spectrum of Co oxalate obtained in Example 5a. Vertical bars at the bottom of the plot correspond to energies characteristic of cobalt.

1.0 g of $SmCo_5$ (2.20 mmol) and 1.68 g (31.4 mmol) of anhydrous $NH_4Cl$ were ball-milled for 6 hours in Spex 8000M shaker mill as described above. Prior to ball milling, the sample was loaded in the vial in air or under argon. After ball milling, the 2 g of the powder formed by the mechanochemical solid state reaction of milling were combined with 100 ml of water and heated at about 100° C. for 4 hours. Next, the magnetic material still present in the reaction mixture was separated from the solution formed using a strong permanent magnet. It was identified as $SmCo_5$, thus 65% (0.65 g) of $SmCo_5$ has reacted with $NH_4Cl$. The solution was filtered and water-soluble Co content was precipitated using oxalic acid. The yield of Co-oxalate (FIGS. 5 and 6) was 77% calculated using the reacted $SmCo_5$ material as base.

A similar reaction that did not include the ball-milling step produced Co-oxalate in only 27% yield, based on the reacted material. Also in this case, the full dissolution of the magnetic phase was not achieved.

Example 6

Figure 7:
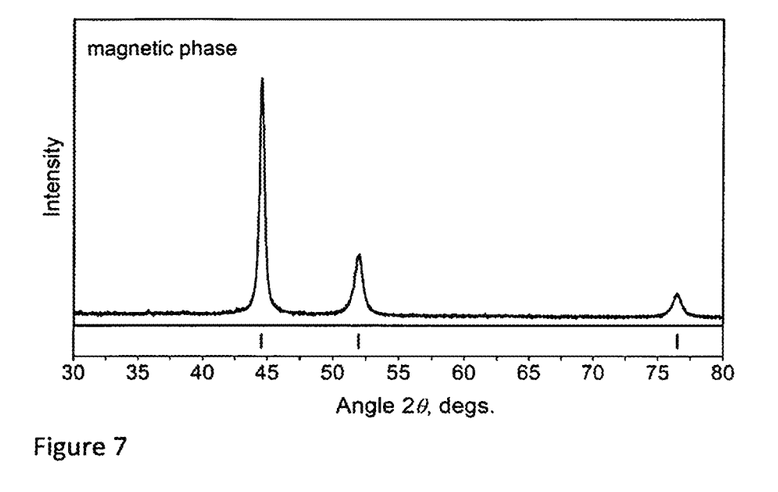
FIG. 7. Powder XRD pattern of the magnetic phase (metallic nickel) obtained in Example 6. Vertical bars at the bottom of the plot correspond to calculated Bragg peak positions of Ni.
Figure 8:
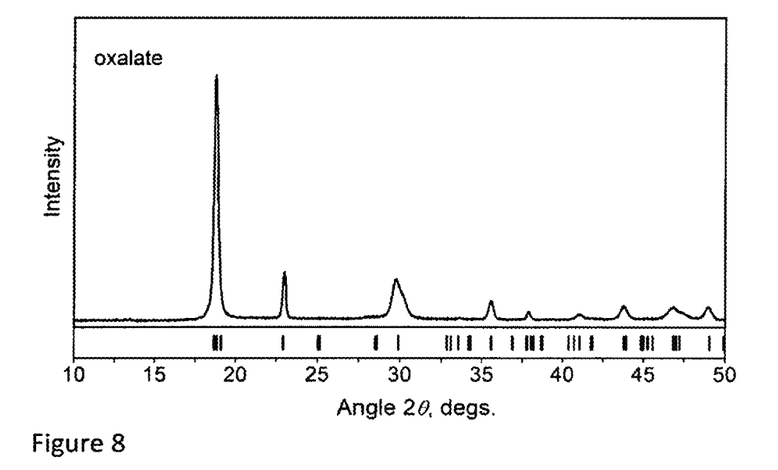
FIG. 8. Powder XRD pattern of nickel oxalate obtained in Example 6. Vertical bars at the bottom of the plot correspond to calculated Bragg peak positions of $[C_2O_4]$Ni·$2H_2O$.
Figure 9:
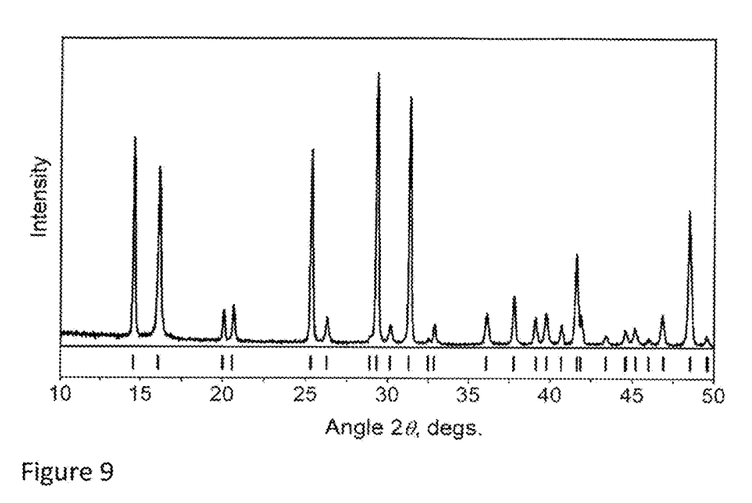
FIG. 9. Powder XRD powder pattern of NaLa$(SO_4)_2 \cdot H_2O$ obtained in Example 6. Vertical bars at the bottom of the plot correspond to calculated Bragg peak positions of NaLa$(SO_4)_2 \cdot H_2O$.

1.0 g of $LaNi_5$ (2.3 mmol) and 1.7 g (31.77 mmol) of anhydrous $NH_4Cl$ were combined with 50 ml of water. The slurry formed was brought to a boil (about 100° C.) while stirred with a magnetic stirrer. The heating continued for 6 hours, then the reaction mixture was left at room temperature overnight. A black magnetic phase (0.6 g) was removed using a strong permanent magnet. Subsequently, the liquid phase was filtered and brought to a boil (about 100° C.). The hot solution was combined with 1.3 g of anhydrous $Na_2SO_4$, which quickly dissolved. A precipitate started to form within a few min. It was filtered off and dried in air. An additional amount of a solid material was precipitated from the remaining filtrate using 1.6 g of oxalic acid. According to the XRD analysis the magnetic material was Ni-metal (FIG. 7) and the oxalate was Ni oxalate (FIG. 8). 0.83 g of $NaLa(SO_4)_2 \cdot H_2O$, 96% of the theoretically expected amount, was isolated and characterized using XRD (FIG. 9).

Example 7

Figure 11:
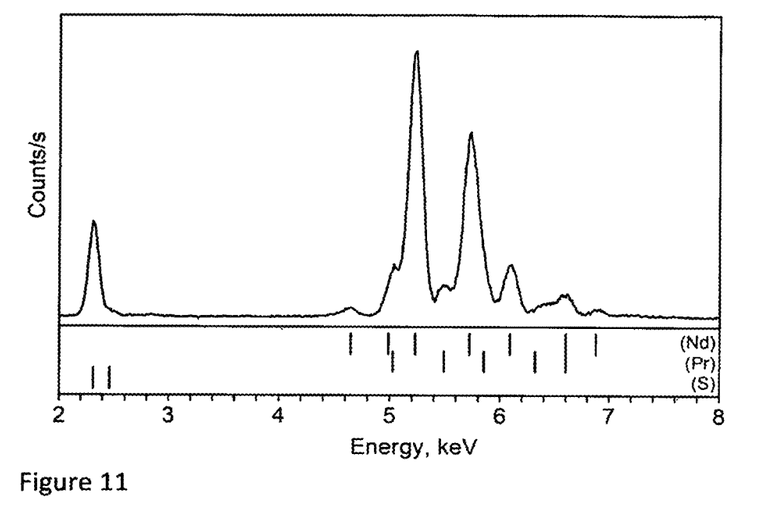
FIG. 11. XRF spectrum of NaNd$_{0.85}$Pr$_{0.15}$$(SO_4)_2 \cdot H_2O$ obtained in Example 7. Vertical bars at the bottom of the plot correspond to characteristic energies of Neodymium, Praseodymium and Sulphur.

3.7 g of magnetic scrap material (MSM, FIG. 10) were dissolved in 35 ml of concentrated HCl upon heating. The reaction mixture formed was diluted with 115 ml of water, filtered to remove a minor amount of insoluble materials and neutralized using aqueous NaOH to obtain solution with acidic pH between 1 and 2. Subsequently, this solution was brought to a boil and combined with 5.1 g of anhydrous $Na_2SO_4$ dissolved in 20 ml of water. Off-white precipitate started to form within a few minutes. The slurry formed was kept at about 80° C. for 1.5 hours, then 2.05 g of a solid product was filtered off and dried in air. The product composition of $NaNd_{0.85}Pr_{0.15}(SO_4)_2 \cdot H_2O$, was identified by combination of XRF (FIG. 11) and XRD analyses.

Figure 12:
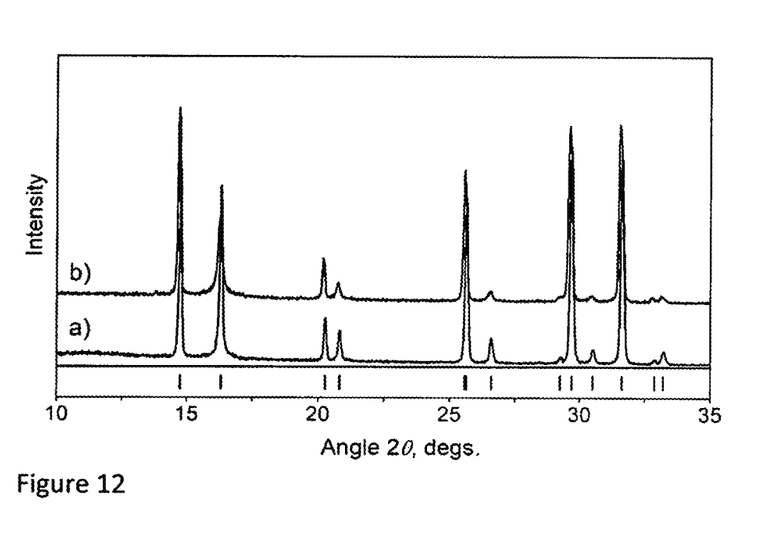
FIG. 12. Powder XRDr patterns of NaNd$_{0.85}$Pr$_{0.15}$$(SO_4)_2 \cdot H_2O$ (b) obtained in Example 7 and NaNd$(SO_4)_2 \cdot H_2O$ (a) obtained in Example 2. Vertical bars at the bottom of the plot correspond to calculated Bragg peak positions of NaNd$(SO_4)_2 \cdot H_2O$.

XRD data confirmed the structure of the obtained triple salt similar to $NaNd(SO_4)_2 \cdot H_2O$, obtained in examples 1, 2, and 3 described above. Partial substitution of Nd atoms with larger size Pr in its structure leads to increase of lattice parameters, and therefore, shifts Bragg reflections toward lower 2θ (FIG. 12). The isolated yield of $NaNd_{0.85}Pr_{0.15}(SO_4)_2 \cdot H_2O$ was used as reference (taken as 100%) for example 8.

Example 8

1.0 g of MSM (FIG. 10) and 4.9 g (30.10 mmol) of anhydrous $FeCl_3$ were combined with 100 ml of water and the slurry formed was brought to a boil (about 100° C.) while stirred with a magnetic stirrer. The heating continued for additional 60 min. The reaction mixture was cooled down and left stirring at room temperature overnight. Then, it was filtered through a glass frit. Subsequently, water was partially evaporated to obtain 50 ml of the solution. 1.5 g of anhydrous $Na_2SO_4$ was added to the latter at about 100° C. The added sulfate quickly dissolved and an off-white precipitate started to form within a few minutes. The solid product was filtered off and dried in air. Using XRD, the material was identified as $NaNd_{0.85}Pr_{0.15}(SO_4)_2 \cdot H_2O$ that was identical to that formed in Example 7. The isolated yield of $NaNd_{0.85}Pr_{0.15}(SO_4)_2 \cdot H_2O$ was 0.41 g, i.e. 77% of the amount collected in Example 7.

Although the present invention has been described with respect to certain particular illustrative embodiments, those skilled in the art will appreciate that modifications and changes can be made thereto without departing from the spirit an scope of the invention as set forth in the appended claims.

REFERENCES, WHICH ARE INCORPORATED HEREIN BY REFERENCE

[1] https://doi.org/10.1016/j.resourpol.2018.06.015 Received 7 Mar. 2018; Received in revised form 27.
[2] https://cmi.ameslab.gov/materials/home.
[3] High Temperature Materials and Processes, Volume 11, Issue 1-4, Pages 175-188, ISSN (Online) 2191-0324, ISSN (Print) 0334-6455, DOI: https://doi.org/10.1515/HTMP.1993.11.1-4.175.
[4] K. Zhou et al. *Hydrometallurgy*, 2017, 174, 66.
[5] X. Chen, Y. Chen, T. Zhou, D. Liu, H. Hu, S. Fan, *Waste Management*, 2015, 38, 349.
[6] H. Hocheng, M. Chakankar, U. Jadhav "Biohydrometallurgical Recycling of Metals from Industrial Wastes", CRC Press, Boca Raton, Fla., 2017, 212 p.
[7] L. Li, J. Ge, R. Chen, F. Wu, S. Chen, X. Zhang, *Waste Manage*, 2010, 30, 2615.
[8] E. G. Polyakov, A. S. Sibilev, *Metallurgist*, 2015, 59, 368.
[9] Y. Bian, Rare Met. DOI 10.1007/s12598-015-0554-x.
[10] G.-X. Ren, S.-W. Xiao, M.-Q. Xie, B. Pan, J. Chen, F.-G. Wang, X. Xia, *Trans. Nonferrous Met. Soc. China*, 2017, 27, 450.
[11] T. Lorenz, P. Froehlich, M. Bertau, *Chemie Ingenieur Technik*, 2017, 89(9), 1210.
[12] Q. Liu, C. Zhong, D. Zhang, S. Z. Faming, (2017), CN 106498190 A 20170315.
[13] M. Bertau, P. Froehlich, T. Lorenz, *Ger. Offen.* (2015), DE 102014206223 A1 20151001.
[14] X. Chi, Z. S. Faming, (2015), CN 104294032 A 20150121.
[15] H. Yamamoto, K. Furusawa, H. Hoshi, A. Kikugawa, M. Miyata, T. Yoshida, *Jpn. Kokai Tokkyo Koho* (2014), JP 2014051718 A 20140320.
[16] M. Itoh, K. Miura, K.-I. Machida, *J. Alloys Compd.*, 2009, 477(1-2), 484.
[17] M. Itoh, K. Miura, K.-I. Machida, *Chem. Lett.*, 2008, 37(3), 372.
[18] T. Aitasalo, J. Holsa, M. Lastusaari, J. Legendziewicz, L. Lehto, J. Linden, M. Marysko, *J. Alloys Compd.*, 2004, 380(1-2), 296.
[19] H. Yamamoto, K. Furusawa, H. Hoshi, A. Kikugawa, M. Miyata, H. Murakami, PCT Int. Appl., 2014, WO 2014057922 A1 20140417.
[20] R. H. Arendit, T. B. Lerman, U.S. (1975), U.S. Pat. No. 3,912,554 A 19751014.
[21] C. Song, O. Ogawa, *Shigen to Sozai*, 1994, 110(14), 1145.
[22] J. Lee, T.-Y. Hwang, H.-B. Cho, J. Kim, Y.-H. Choa, *Scientific Reports*, 2018, 8(1), 1.
[23] H. Ohrai, H. Yokoi, PCT Int. Appl., 2003, WO 2003078671 A1 20030925.
[24] T. Uda Mater. *Transactions*, 2002, 43(1), 55.
[25] T. Mikiya, O. Tatsuya, K. Kazuya, N. Hirokazu, O. Tetsuo, *Handbook on the Physics and Chemistry of Rare Earths*, 2013, 43, 159.
[26] R. D. Shannon, *Acta Crystallograph. A*, 1976, 32(5), 751.
[27] T. Mikiya et al., *Handbook of Physics and Chemistry of Rare Earths*, 2013, 43, 159.
[28] P. N. Iver et al., *Less-Common Met.*, 1989, 146, 161.
[29] A. Venkataraman et al., *J. Phys. Chem. Solids*, 1992, 53, 681.
[30] H. E. Swanson et al., Nat. Bur. Stand., *U.S. Circ.* 539, 1953, 1, 13.
[31] R. Derieux et al., *Bull. Soc. Chim. Fr.*, 1973, 25.
[32] R. D. Shannon, *Acta. Crystallograph A*, 1976, 32(5), 751.

We claim:

1. A method for use in recycling of a material that includes a metal content to be recovered comprising at least one of a rare earth metal, cobalt, and nickel, wherein the rare earth metal includes at least one of Sc, Y, La, Ce, Pr, Nd, Sm, Eu, Gd, Tb, Dy, Ho, Er, Tm, Yb, and Lu, comprising the step of contacting the material and a chemical reagent that includes at least one of an ammonium salt and iron (lll) salt without added oxygen reagent at a temperature up to about 100° C. to carry out at least one of a liquid phase chemical reaction and a mechanochemical reaction with the metal content to form a non-oxide and water soluble derivative of the at least one rare earth metal, cobalt and nickel.

2. The method of claim 1 wherein the contacting is carried out at a temperature from room temperature to about 100° C.

3. The method of claim 1 where the contacting is carried out by mechanical milling of the material in the presence of at least one of the ammonium salt and iron (lll) salt in the absence of water or another solvent to achieve a mechanochemical solid state reaction.

4. The method of claim 1 where the contacting is carried out by mechanical milling of the material in the presence of water and of at least one of the ammonium salt and iron (lll) salt at room temperature.

5. The method of claim 1 where the contacting is carried out in an aqueous environment or in a solution containing water as one component.

6. The method of claim 5 where the contacting is carried out in a first step by means of the mechanochemical reaction and then in a second step by means of the liquid phase chemical reaction in aqueous environment at a temperature from room temperature to about 100° C.

7. The method of claim 1 wherein the material comprises at least one of a permanent magnet alloy and a battery alloy containing at least one of the rare earth metal, cobalt and nickel.

8. The method of claim 1 that produces a water-soluble derivative of Sc, Y, La, Ce, Pr, Nd, Sm, Eu, Gd, Tb, Dy, Ho, Er, Tm, Yb, Lu, Ni or Co.

9. The method of claim 8 comprising precipitating the water soluble derivative of at least one rare earth metal in the form of a rare earth metal compound.

10. The method of claim 8 comprising precipitating the water soluble derivative of least one of cobalt and nickel in the form of at least one of a cobalt compound and nickel compound.

11. The method of claim 9 including the further step of calcining the rare earth metal compound to produce a rare earth metal oxide.

12. The method of claim 1, wherein the ammonium salt contains at least one anion comprising a $Cl^-$, $Br^-$, $I^-$, $NO_3^-$, $HSO_4^-$, and $SO_4^{2-}$.

13. The method of claim 1, wherein the iron (lll) salt contains at least one anion comprising a $Cl^-$, $Br^-$, $I^-$, $NO_3^-$, $HSO_4^-$, and $SO_4^2$.

14. The method of claim 1, wherein the contacting includes contacting the ammonium salt and a samarium-cobalt permanent magnet or magnetic alloy.

15. The method of claim 1, wherein the contacting includes contacting the ammonium salt and a rare earth-iron-boron permanent magnet or magnetic alloy.

16. The method of claim 1, wherein the contacting includes contacting the ammonium salt and a rare earth-containing magnet material or alloy and/or nickel-based battery material or alloy.

17. The method of claim 1, wherein the contacting includes contacting the iron (lll) salt and a samarium-cobalt permanent magnet or magnetic alloy.

18. The method of claim 1, wherein the contacting includes contacting the iron (lll) salt and a rare earth-iron-boron permanent magnet or magnetic alloy.

19. The method of claim 1, wherein the contacting includes contacting the iron (lll) salt and a rare earth-containing magnet material and/or a nickel-based battery material or alloy.

20. The method of claim 1, wherein the chemical reaction or mechanochemical reaction is carried out in an aqueous environment.

21. The method of claim 20, wherein the aqueous environment is maintained at a temperature between 0° C. and about 100° C.

22. The method of claim 1 wherein the mechanochemical reaction is conducted by at least one of mechanical milling and grinding of the material.

23. The method of claim 22, wherein at least one of the mechanical milling and grinding is carried out in a ball mill, a planetary mill, a shaker mill, a crusher and a grinder for time period of at least 5 minutes to 24 hours.

24. The method of claim 1, wherein the contacting of the material dissolves rare earth metal content to form the water soluble derivative and then the water soluble derivative is precipitated as a rare earth metal oxalate, rare earth metal sulfate, rare earth metal-sodium sulfate, rare earth metal phosphate, or rare earth metal fluoride.

25. The method of claim 1 wherein the material comprises magnet scrap or battery scrap.

26. The method of claim 25 wherein the magnet scrap includes shredded non-magnet components.

27. The method of claim 1 wherein the material comprises at least one of grinding swarf, magnet scrap cuttings, polishing byproducts, magnet powders, and magnets derived from manufacturing processes including magnet manufacturing and additive manufacturing processes.

28. A method for use in recycling of a material that includes a metal content to be recovered comprising at least one of a rare earth metal, cobalt, and nickel, wherein the rare earth metal includes at least one of Sc, Y, La, Ce, Pr, Nd, Sm, Eu, Gd, Tb, Dy, Ho, Er, Tm, Yb, and Lu, comprising the step of contacting the material and a chemical reagent that includes at least one of an ammonium salt and iron (lll) salt to carry out a mechanochemical reaction in the absence of water or solvent to form a derivative of the at least one rare earth metal, cobalt and nickel.

29. The method of claim 28 wherein the mechanochemical reaction is conducted by at least one of mechanical milling and grinding of the material.

30. The method of claim 29 wherein at least one of the mechanical milling and grinding is carried out in a ball mill, a planetary mill, a shaker mill, a crusher and a grinder for time period of at least 5 minutes to 24 hours.

31. A method for use in recycling of a material that includes a metal content to be recovered, comprising at least one of a rare earth metal, cobalt, and nickel, wherein the rare earth metal includes at least one of Sc, Y, La, Ce, Pr, Nd, Sm, Eu, Gd, Tb, Dy, Ho, Er, Tm, Yb, and Lu, comprising the step of contacting the material and an iron (lll) salt reagent to carry out at least one of a liquid phase chemical reaction and a mechanochemical reaction to form a water soluble derivative of the at least one of the rare earth metal, cobalt and nickel.

32. The method of claim 31, wherein the iron (lll) salt contains at least one anion comprising a $Cl^-$, $Br^-$, $I^-$, $NO_3^-$, $HSO_4^-$, and $SO_4^{2-}$.

* * * * *